United States Patent [19]

Martin, Jr.

[11] Patent Number: 5,806,552
[45] Date of Patent: Sep. 15, 1998

[54] FLUID VALVE

[75] Inventor: Robert D. Martin, Jr., Myrtle Beach, S.C.

[73] Assignee: Sterling Plumbing Group, Inc., Rolling Meadows, Ill.

[21] Appl. No.: 821,495

[22] Filed: Mar. 21, 1997

[51] Int. Cl.[6] .................................................. F16K 11/02
[52] U.S. Cl. ..................... 137/270; 137/625.41
[58] Field of Search ............... 137/270, 625.41, 137/269, 271, 625.4, 454.5, 454.6

[56] References Cited

U.S. PATENT DOCUMENTS

| | | |
|---|---|---|
| 1,762,619 | 6/1930 | Fleming . |
| 2,439,712 | 4/1948 | Brady . |
| 3,078,476 | 2/1963 | Doty et al. . |
| 3,307,205 | 3/1967 | Moeschler . |
| 3,583,004 | 6/1971 | Watts . |
| 3,674,048 | 7/1972 | Manoogian et al. . |
| 3,823,737 | 7/1974 | Szymanski . |
| 4,074,689 | 2/1978 | Lenay . |
| 4,584,723 | 4/1986 | Hussauf . |
| 4,609,007 | 9/1986 | Uhl . |
| 4,676,270 | 6/1987 | Knapp et al. . |
| 4,804,011 | 2/1989 | Knapp . |
| 5,095,934 | 3/1992 | Iqbal . |
| 5,325,887 | 7/1994 | Egli et al. . |
| 5,331,997 | 7/1994 | Bosio . |
| 5,402,819 | 4/1995 | Bosio . |
| 5,425,394 | 6/1995 | Clare ........................................ 137/270 |

*Primary Examiner*—Kevin Lee
*Attorney, Agent, or Firm*—Quarles & Brady

[57] ABSTRACT

A cartridge-type valve is disclosed which is capable of having the flow of hot and cold water to the valve reversed for use in back to back installations. An adapter gasket is provided which has three independent pathways. In one position, the adapter effects respective fluid communication between hot and cold water inlet pipes and hot and cold water inlets in the stationary valve portion. In a second position, when the adapter gasket is removed from the valve body and turned over, communication between the hot and cold water inlet pipes and the hot and cold water inlets in the stationary valve portion is reversed. In both positions, the adapter gasket also effects communication between the outlet of the valve and the outlet of a valve housing, and further it seals all connections at all times.

11 Claims, 4 Drawing Sheets

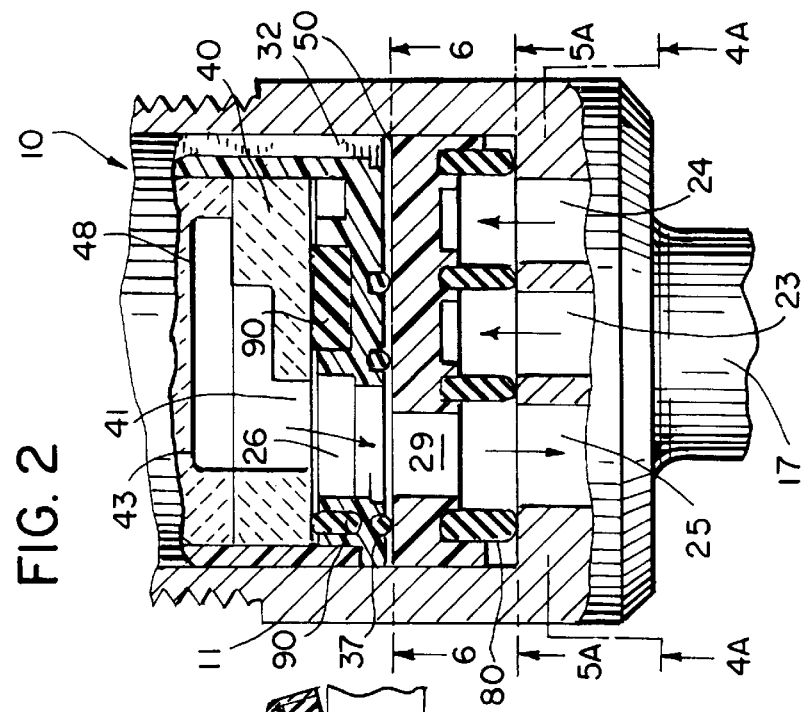
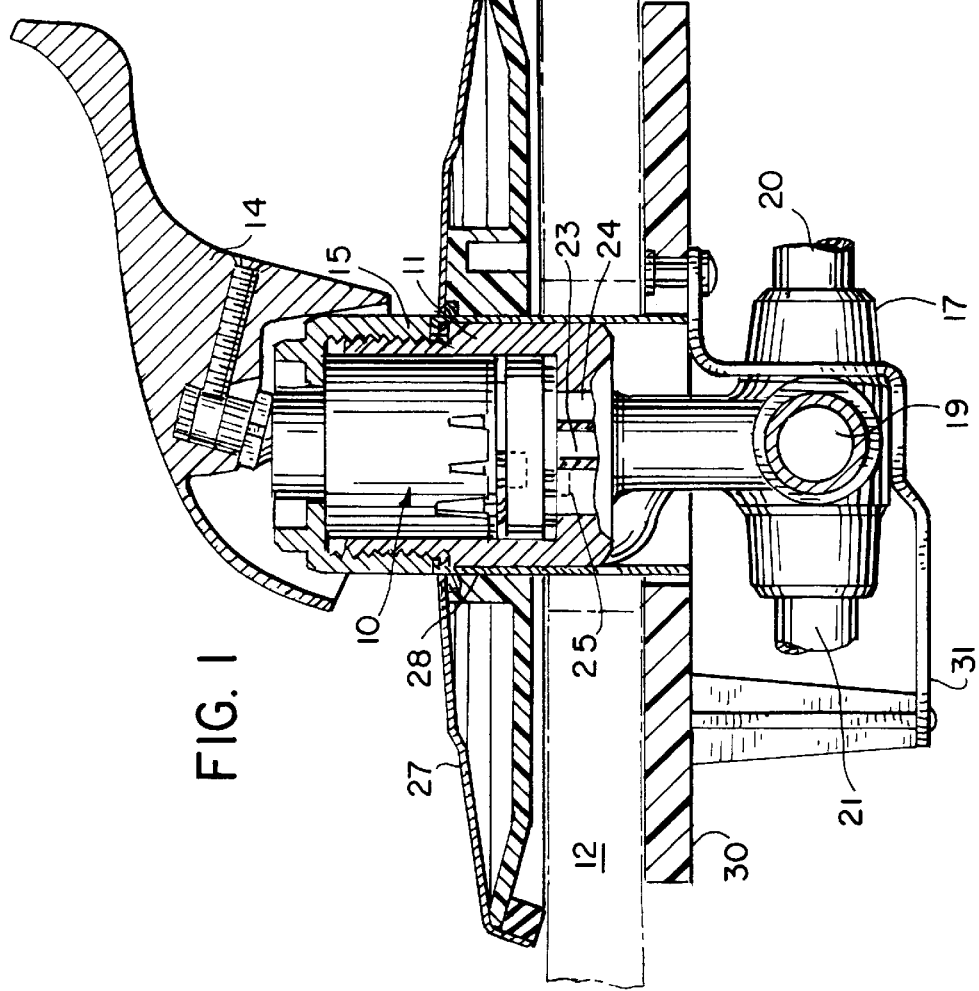
FIG. 1
FIG. 2

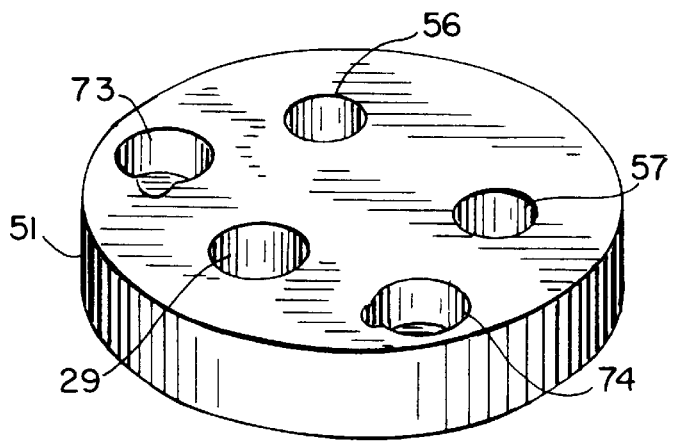
FIG. 3B
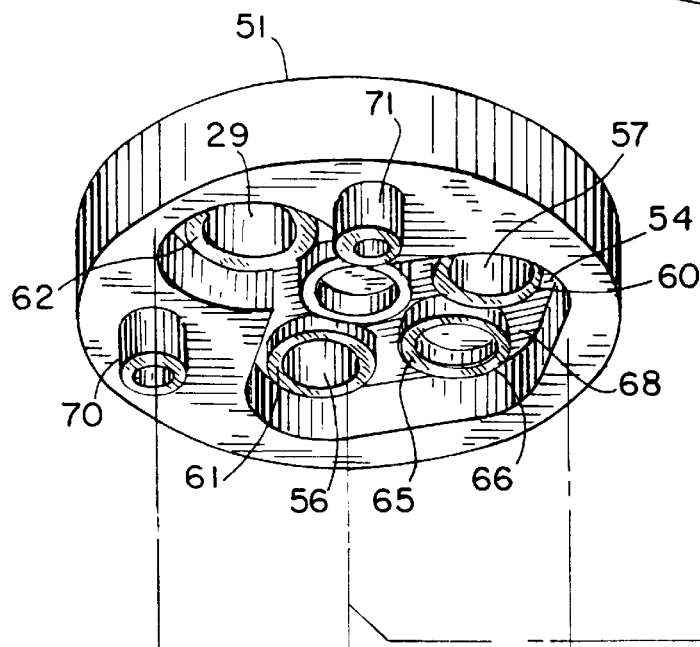
FIG. 3A
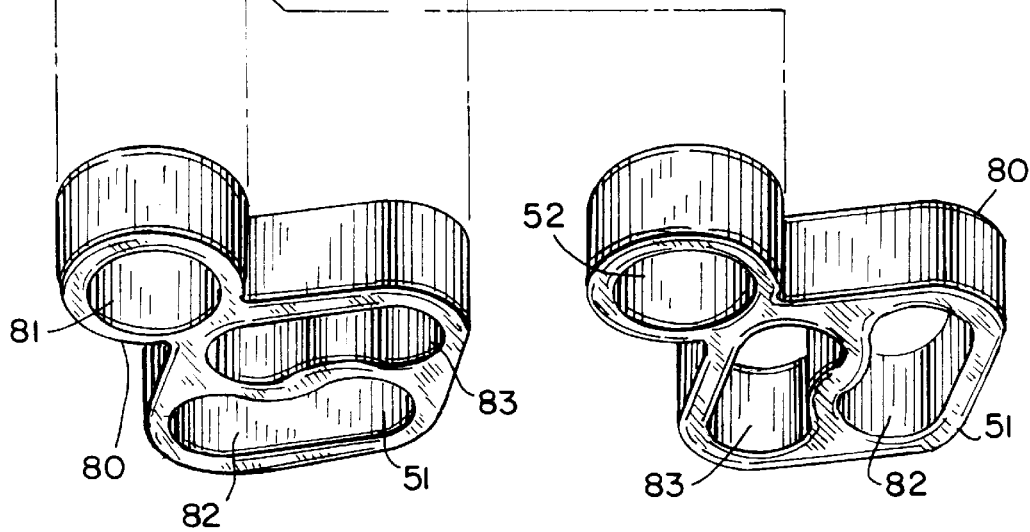

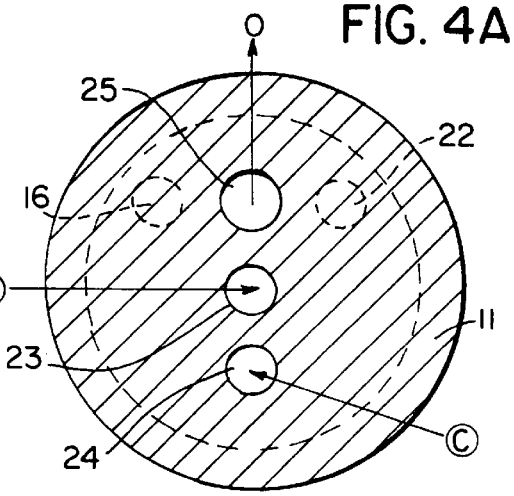
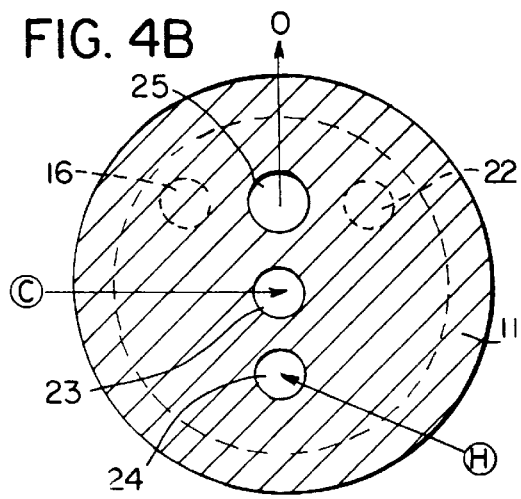
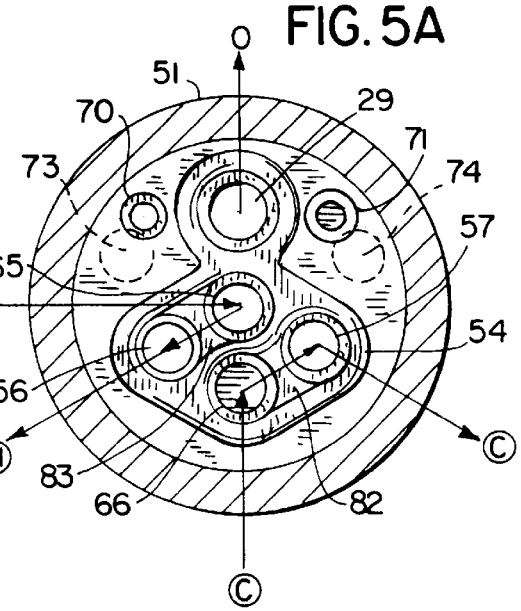
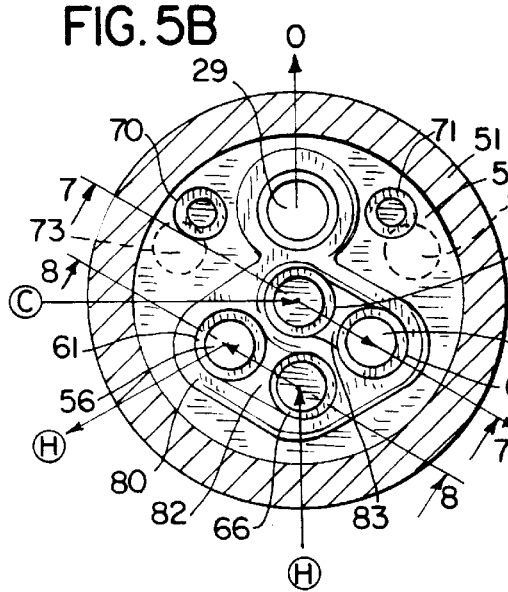
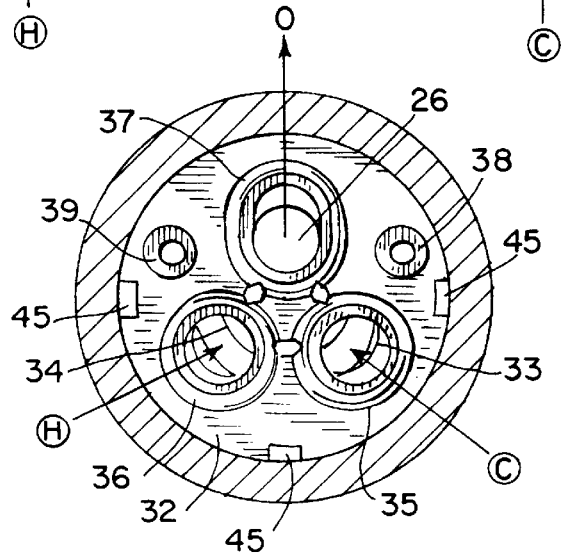

FLUID VALVE

BACKGROUND OF THE INVENTION

This invention relates primarily to fluid valves which control the mixing of hot and cold water. More particularly, the invention relates to fluid valves of the foregoing type wherein the flow path of the hot and cold water can be reversed (e.g. to facilitate back to back type installation in adjacent bathrooms).

It is often convenient to have fluid valves in two different rooms placed on opposite sides of a common wall so that both can use common supply pipes. In this situation the cold water supply pipe which is on the right for the first fluid valve is on the left for the other. If a single type of valve is used, expensive crossover plumbing can be required (e.g. U.S. Pat. No. 3,823,737). If not, the plumber sometimes carries two different types of valves.

In the alternative, adapters have been used in order to reverse the flow of hot and cold water through the valves. For example, see U.S. Pat. Nos. 4,378,029; 4,676,270; 4,804,011; and 5,095,934. A problem with many of the prior art adapter units is that they are of a multicomponent type, and in some instances are interconnected to one of the flow plates in the faucet housing. In other instances, complicated fabricating techniques are required or attachment devices are required in order to position the reversing mechanism. In other instances, the adapter is positioned internally in the faucet housing requiring significant labor for it to be taken apart in order to effect the desired reversing feature. In yet other instances, there is not available an adapter specifically designed for use with valve housings which afford both tub and shower outlets.

BRIEF SUMMARY OF THE INVENTION

In one aspect, the invention provides:

A valve for use in a housing, the housing having first and second fluid inlets and an outlet, the valve being of a type wherein the flow path of fluid from the inlets through the valve can be interchanged. A valve body has an axial bore and a lower end with three holes, one for permitting communication with the outlet, and two for permitting communication with the inlets.

A movable valve element is rotatable in the bore over a lower end to regulate flow from the inlets to the outlet.

An adapter gasket is receivable between the inlets and outlet on the one hand and the valve body lower end, wherein the adapter gasket is constructed and arranged to provide in a first position communication between the first inlet and a first hole while also providing separate communication between the second inlet and the second hole; and wherein when the adapter gasket is turned over from the first position and placed between the inlets and valve body lower end, the adapter gasket provides communication between the first inlet and the second hole, while also providing separate communication between the second inlet and the first hole, the adapter gasket also being constructed with a third separate flow path providing communication between the exit in the valve body and the third hole in either the first or second adapter gasket position.

In a preferred form, the adapter gasket is retained in an insert member and the insert member includes a cavity for reception of the adapter gasket.

In another aspect, there are alignment means extending between the insert member and the lower end.

In yet another preferred form, the insert member includes five raised sealing sleeves for contact with the adapter gasket.

In still another preferred form, there is an adapter system for use in reversing a hot and cold water supply to a valve which includes an insert member for placement between a valve body and a valve housing, the insert member including first and second water inlets and an outlet.

A seal member is receivable in the insert member and has three pathways therethrough wherein the seal member is constructed and arranged to provide in a first position communication between the first inlet, and a first pathway, while also providing separate communication between the second inlet and a second pathway. The seal member is constructed so that when the seal member is turned over from the first position to a second position and again received in the insert member, the seal member provides communication between the first inlet and the second pathway, while also providing separate communication between the second inlet and the first pathway, the seal member also providing communication between the third pathway and outlet in either position.

The objects of the invention therefore include:

a. providing a valve of the above kind which is readily convertible to hot and cold water supply lines irrespective of their positioning;

b. providing a valve of the above kind which can be manufactured with few parts;

c. providing a valve of the above kind which is easily removed from and replaced in a valve housing;

d. providing an adapter for a valve of the above kind which can be easily fitted into a valve housing and orientated with a valve cartridge; and e. providing a valve of the above kind which has improved sealing features.

These and still other objects and advantages of the invention will be apparent from the description which follows. In the detailed description below, a preferred embodiment of the invention will be described in reference to the accompanying drawings. This embodiment does not represent the full scope of the invention. Rather, the invention may be employed in other embodiments. Reference should therefore be made to the claims herein for interpreting the breadth of the invention.

BRIEF DESCRIPTION OF THE DRAWINGS

FIG. 1 is a sectional view of a fluid valve constituting a preferred embodiment of the invention with portions in full;

FIG. 2 is an enlarged sectional view illustrating some of the valve parts;

FIG. 3A is an exploded view of the adapter unit components and illustrating reversibility of the seal component in the insert member;

FIG. 3B is a top view of insert member shown in FIG. 3A;

FIG. 4A is a sectional view taken along line 4A—4A of FIG. 2;

FIG. 4B is a view similar to FIG. 4A illustrating a different flow path of water;

FIG. 5A is a sectional view taken along line 5A—5A of FIG. 2;

FIG. 5B is a view similar to FIG. 5A illustrating a different orientation of the seal component;

FIG. 6 is a sectional view taken along line 6—6 of FIG. 2;

DETAILED DESCRIPTION

Figure 3:
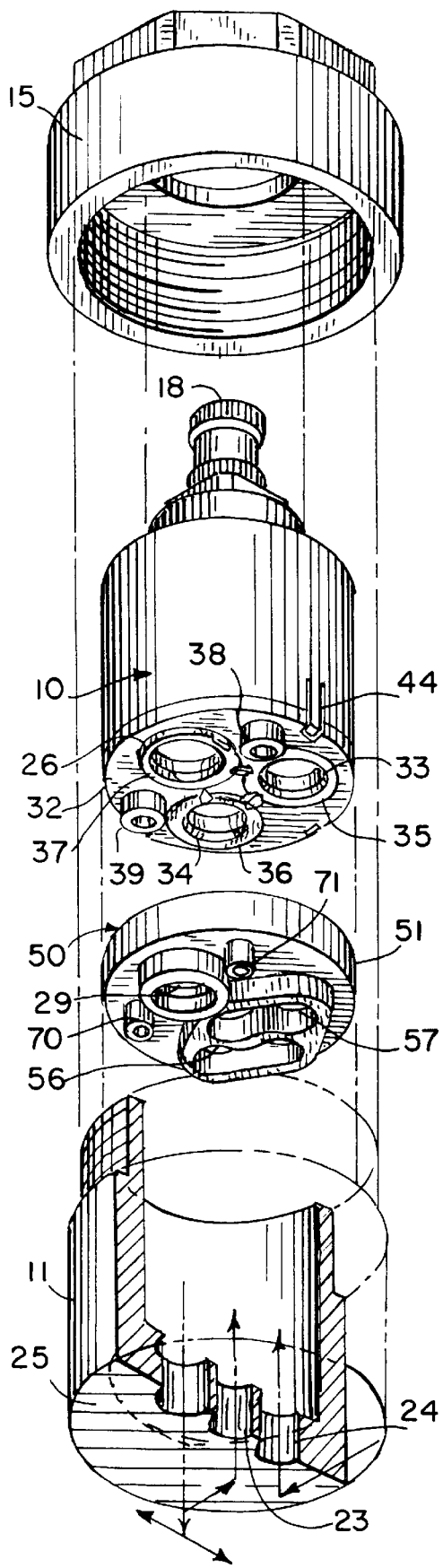
FIG. 3 is an exploded perspective view of the valve assembly parts shown in FIG. 1.

Referring to FIGS. 1 and 2, a cartridge valve assembly, generally 10, is shown in conjunction with a faucet housing 11 that is mounted on a support 12 in the usual manner. The direction arrows in FIG. 2 illustrate the pathway of water through the cartridge valve from the control unit 17 which supplies hot and cold water to the hot and cold inlets 23 and 24, respectively, in the faucet housing 11. Water travels upwardly through the valve 10 and downwardly through the outlet 41 in the stationary disk 40, the outlet 26 in the base 32 of the valve, outlet 29 in the adapter gasket 50 and outlet 25 in the faucet housing 11 to where it returns to the control unit 17. There it will feed water to outlets 20 and 21 for a tub and shower fixture.

An escutcheon 27 and a sleeve 28 surround the housing 11. The control unit 17 is connected to an underplate 30 by the bracket 31. As best seen in FIGS. 1 and 3, a bonnet 15 is threaded to the valve housing 11 to retain the cartridge valve therein. A valve stem 18 extends upwardly from the cartridge valve 10 and through the bonnet 15 for a connection with the handle 14. The valve stem 18 controls the usual movable ceramic disk 43 with water passage 48 for movement over a stationary disk 40 as seen in FIG. 2 for control of water from inlets 46 and 47 of disk 40 (See FIGS. 7 and 8) to outlet 41 in a customary manner.

In accordance with the present invention, and referring particularly to FIGS. 2, 3, 3A, and 3B, positioned below the base 32 of cartridge valve 10 is an adapter gasket, generally 50, which like valve 10 fits into the valve housing 11. Guides 38 and 39 extending from base 32 fit into guide pockets 73 and 74 of the insert 51 of adapter 50. Guideposts 70 and 71 of insert 51 in turn fit into guide openings 16 and 22 of valve housing 11. This is seen in FIGS. 4A and 4B.

Referring specifically to FIG. 3A, extending through insert 51 is the previously described water outlet passage 29 as well as water inlet passages 56 and 57. These inlet passages and outlet communicate with a cavity 54 which receives a seal member 80. Surrounding outlet 29 and inlet passages 56 and 57 in the cavity are raised sealing sleeves 62, 61, and 60. There are in addition two raised annular sealing sleeves 65 and 66. These annular sealing portions 65 and 66 align with the inlets 23 and 24 of the valve housing 11 when insert 51 is placed thereon. Seal 80 has a pathway 81 which, when placed in the cavity 54, surrounds sleeve 62 of outlet passage 29. Seal 80 also includes two elliptical pathways 82 and 83 for surrounding the raised sleeves 61 and 60 of inlet passages 56 and 57 and the raised annular sealing sleeves 65 and 66 in a paired manner. This is best seen when viewing FIGS. 5A and 5B.

As seen in FIG. 5A, and considered in conjunction with FIGS. 3 and 4A, the insert 51 is placed in the valve housing 11 such that outlet 25 is oriented with outlet passage 29 and inlets 23 and 24 are aligned with sealing sleeves 65 and 66. Assuming that the seal 80 is positioned in the manner shown in FIG. 5A, hot water entering through inlet 23 of the faucet housing 11 enters in the direction of the sealing sleeve 65 and is directed to the inlet passage 56 by means of the directional portion or pathway 83. Cold water entering through inlet 24 flows in the direction of sealing sleeve 66 and is guided by the pathway 82 to the inlet passage 57. In this manner, and referring to FIG. 6, hot water passes through the inlet passage 56 and into inlet 34 of the valve base 32 whereas cold water passes through inlet passage 57 and into inlet 33 of the valve base. As seen in FIGS. 6 and 3, valve base 32 is retained on cartridge valve 10 by the clips 44 and notches 45.

The previously described flow path of water from housing 11, through adapter 50 and into valve 10 would be the normal pathway. Assuming now that the hot and cold water inlets 23 and 24 are now reversed such as in a back-to-back installation, so that cold water would enter through the inlet 23 and hot water through the inlet 24. In order to compensate for this and present hot and cold water to the inlets 34 and 33, respectively, of the valve 10, all that is required is to remove seal 80 from cavity 54 as positioned in FIG. 5A, rotate it 180 degrees or turn it over and replace it into cavity 54 as shown in FIG. 5B. In this latter position, hot water entering through the inlet 24 and into sealing sleeve 66 will flow to the inlet passage 56 by means of pathway 82. On the other hand, cold water, now passing through inlet 23, will pass into sealing sleeve 65 along pathway 83 and to inlet passage 57. This then places hot water in the valve inlet 34 and cold water in the valve inlet 33. Directional arrows marked with encircled "H"s and "C"s illustrate the previously described flow paths.

Figure 7:
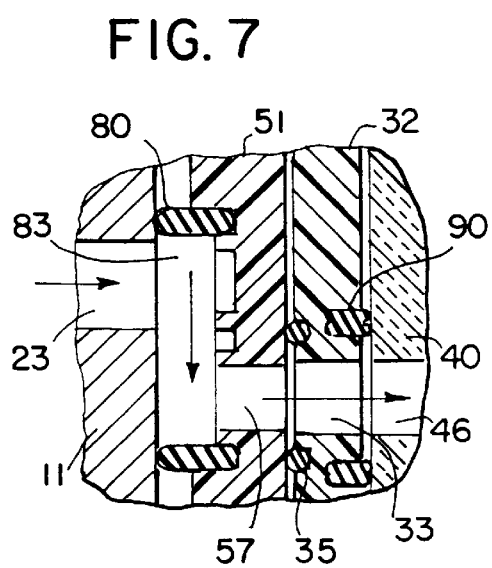
FIG. 7 is a sectional view taken along line 7—7 of FIG. 5B.
Figure 8:
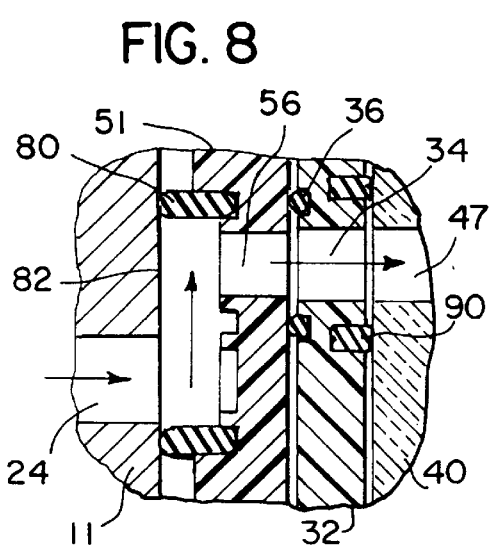
FIG. 8 is a sectional view taken along line 8—8 of FIG. 5B.

As seen in conjunction with FIG. 7, the passage of cold water from inlet 23 along pathway 83 through inlet passage 57, valve inlet 33 and into the inlet 46 of the stationary disk 40, is illustrated. Similarly, the flow of hot water from inlet 24 along the pathway 82 and into the inlet passages 56, valve inlet 34 and the inlet 47 of the ceramic disk 40, is illustrated in conjunction with FIG. 8.

An important feature of the adapter 50 is in the design of the seal member 80 which has the general configuration of a snowman. It is composed of a semi-rigid material so that when the pathways 81, 82, and 83 surround the raised sleeves 60–66, a watertight connection is made. The watertight connection is made not only between the inlets but the outlet as well. In addition to providing the previously described sealing feature of seal member 80, it also affords a sealing contact between the adapter 50 and the faucet housing 11. This is seen in FIG. 2. Referring to FIGS. 6 and 3B, additional seals such as shown at 37, 35 and 36 surround outlet 26 and inlets 33 and 34 of valve base 32 for sealing contact with outlet 29 and inlets 57 and 56, respectively, of insert 51. There are also additional seals such as shown at 90 between the stationary disk 40 and the valve base 32.

It will therefore be appreciated that a hot to cold water or cold to hot water conversion can be achieved in a mixing valve by merely removing a seal, rotating it or turning it over, and replacing it. An additional advantage in this respect is afforded as the adapter is positioned outside the bottom of the valve housing so that no parts need be removed from the valve body to afford access.

Still another feature of the valve assembly resides in the adapter not requiring any additional seals in contact with the valve housing. Another feature is the fact that the insert is easily cast in one piece thus obviating having to weld several components together as in some adapters.

Yet another feature is the ability to accommodate an outlet passage for water.

Thus, the invention provides an improved valve assembly. While the preferred embodiment has been described above, it should be readily apparent to those skilled in the art that a number of modifications and changes may be made without departing from the spirit and scope of the invention. For example, while a plumbing valve has been shown, the valve can be used with other types of fluid valves. Also, the specific materials mentioned are not the only materials which can be used. All such and other modifications within the spirit of the invention are meant to be in the scope of the invention.

What is claimed is:

1. A valve for use in a housing, the housing having first and second fluid inlets and an outlet, the valve being of a type that can interchange the flow path of fluid from said inlets through the valve, comprising:

a valve body having an axial bore and a lower end with first, second and third holes, one for permitting communication with the outlet, and two for permitting communication with the inlets;

a movable valve element rotatable in the bore over a lower end to regulate flow from the inlets to the outlet;

an adapter gasket receivable between the inlets and the valve body lower end, the adapter gasket constructed and arranged to provide in a first position communication between the first inlet and said first hole while also providing separate communication between the second inlet and the second hole;

the adapter gasket is further constructed and arranged so that when the adapter gasket is turned over from the first position and placed between the inlets and valve body lower end in a second position, the adapter gasket provides communication between the first inlet and the second hole, while also providing separate communication between the second inlet and the first hole, the adapter gasket also being constructed with a separate flow path providing communication between the outlet in the valve housing and the third hole in either the first or second adapter gasket position.

2. The valve of claim 1, wherein the adapter gasket is retained in an insert member.

3. The valve of claim 2, wherein the insert member includes a cavity for reception of the adapter gasket.

4. The valve of claim 2, wherein there are alignment means extending between the insert member and the lower end.

5. The valve of claim 2, wherein the insert member includes three raised sealing sleeves for contact with the adapter gasket.

6. The valve of claim 5, wherein the insert member further includes two additional raised sealing sleeves for contact with the adapter gasket.

7. An adapter system for use in reversing a hot and cold water supply to a valve comprising:

an insert member for placement between a valve body and a valve housing, the insert member including first and second water inlets and an outlet; and a seal member receivable in the insert member and having three pathways therethrough, the seal member is constructed and arranged to provide in a first position communication between the first inlet and a first of said three pathways, while also providing separate communication between the second inlet and a second of said three pathways and the seal member is constructed so that when the seal member is turned over from the first position to a second position and again received in the insert member, the seal member provides communication between the first inlet and the second of said three pathways, while also providing separate communication between the second inlet and the first of said three pathways, the seal member also providing communication between a third of said three pathways and outlet in either position.

8. The adapter of claim 7, wherein the insert member includes a cavity for reception of the seal member.

9. The adapter of claim 7, wherein the insert member includes three raised sealing sleeves defining in part the first and second water inlets and the outlet.

10. The adapter of claim 9, wherein the insert member further includes two additional raised sealing sleeves portions defining in part inlet portions.

11. The adapter of claim 7, wherein the seal member is of a generally snowman configuration.

* * * * *